United States Patent [19]

Goodwin et al.

[11] 4,336,540
[45] Jun. 22, 1982

[54] RADAR SYSTEM

[75] Inventors: William V. Goodwin, Cinnaminson, N.J.; James S. Williams, deceased, late of Moorestown, N.J., by Elizabeth J. Williams, executrix

[73] Assignee: RCA Corporation, New York, N.Y.

[21] Appl. No.: 191,664

[22] Filed: Sep. 29, 1980

[51] Int. Cl.³ ............................................... G01S 3/14
[52] U.S. Cl. ............................. 343/16 R; 343/100 SA
[58] Field of Search ................. 343/11 R (U.S. only), 343/16 R, 100 SA

[56] References Cited

U.S. PATENT DOCUMENTS

| | | | |
|---|---|---|---|
| 2,713,161 | 7/1955 | Fiske | 343/100 SA |
| 3,296,579 | 1/1967 | Farr et al. | 343/11 R X |
| 3,364,484 | 1/1968 | Best | 343/16 R |
| 3,413,633 | 11/1968 | Lehmann | 343/100 SA X |
| 3,487,408 | 12/1969 | Clarke | 343/16 R X |
| 3,528,070 | 9/1970 | Young, Jr. | 343/11 R |
| 3,842,417 | 10/1974 | Williams | 343/100 SA X |
| 4,034,374 | 7/1977 | Kruger | 343/16 R |

Primary Examiner—T. H. Tubbesing
Attorney, Agent, or Firm—Samuel Cohen; Robert L. Troike

[57] ABSTRACT

RF burst signals are radiated via a first linear array to provide a first fan beam and return echo signals are received by a second linear array generally orthogonal to said first linear array and having a fan beam pattern orthogonal to said first fan beam. The system includes means coupled to said second linear array for changing the relative phase of the signals from the second linear array between echo returns to scan the second fan beam pattern.

4 Claims, 11 Drawing Figures

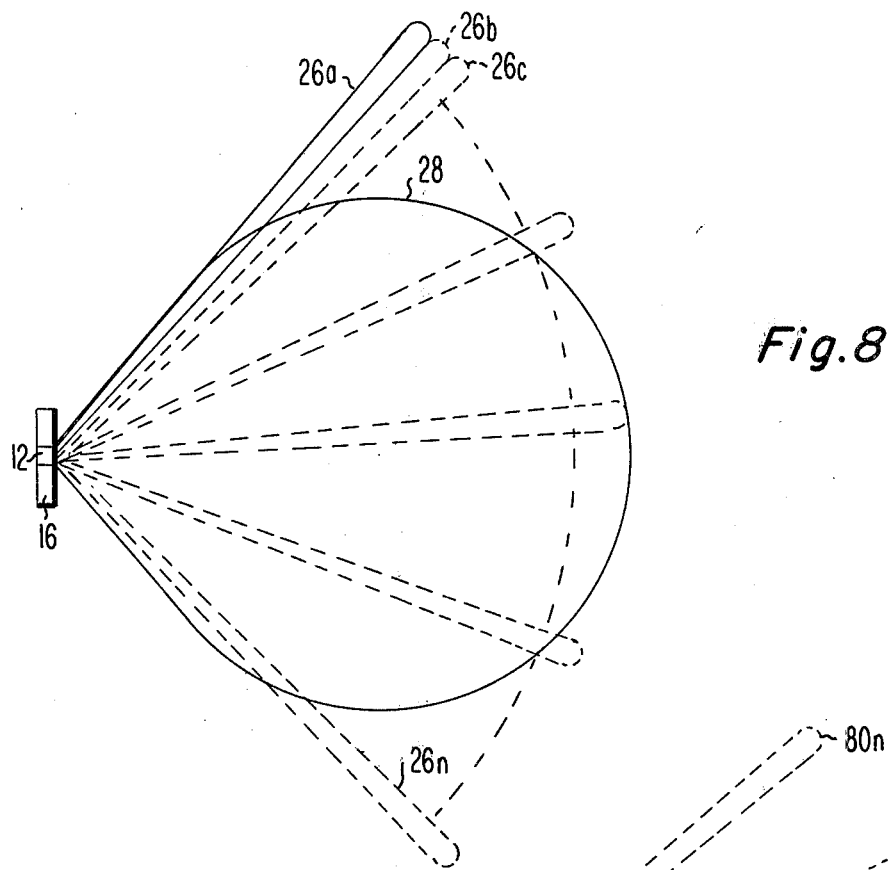
Fig.8
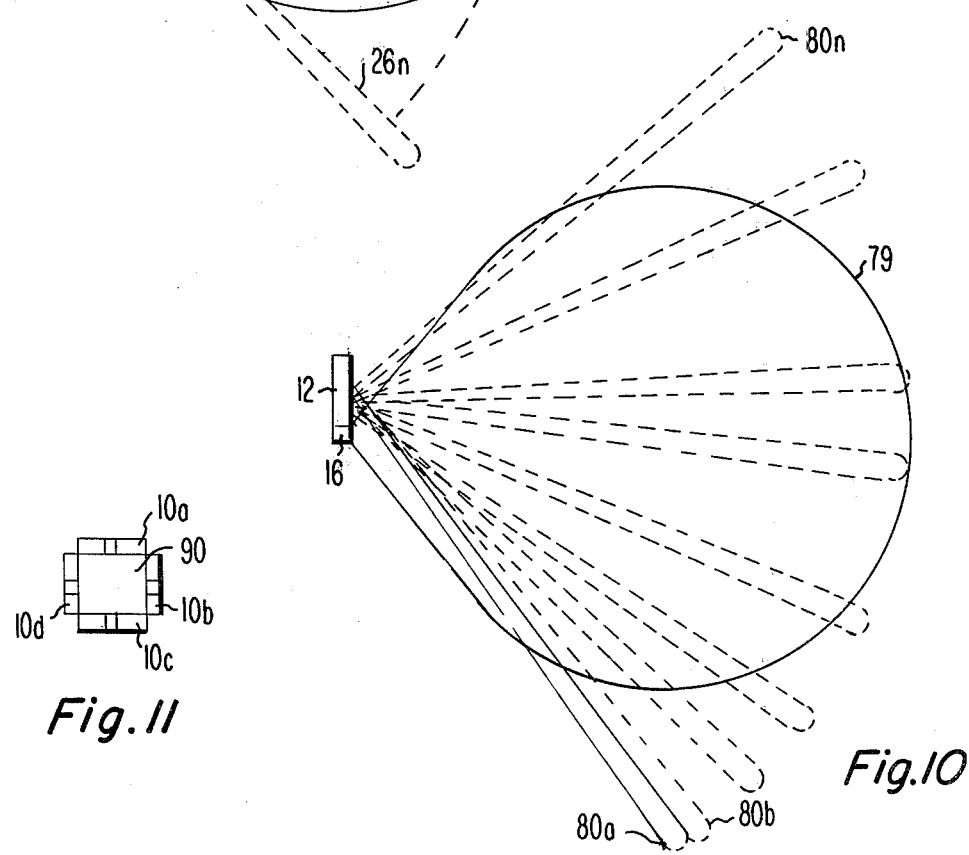
Fig.11
Fig.10

RADAR SYSTEM

The present invention generally relates to radar systems and, in particular, relates to such systems which provide for the precise surveillance and tracking of a target.

In many applications, such as air traffic control, a radar system is required to not only provide continuous surveillance of a large volume of air space but also to simultaneously provide for the precise tracking of a large number of individual targets. These two requirements are substantially incompatible with the use of conventional radars having rotating antenna dishes. The incompatibility arises because surveillance requires a relatively large beamwidth and a relatively slow antenna rotation rate, whereas precise target tracking requires a relatively narrow beamwidth and a relatively high antenna rotation rate.

A phased array radar system having a nonrotating, or fixed, phased array antenna is ideally suited to meet these conflicting demands because such phased array systems have an inherent beam scanning flexibility and have no antenna rotation rate limitations. Thus, a phased array radar system with a fixed phased array antenna can provide both large volume surveillance and provide for the precise tracking of individual targets.

Conventional phased array antennas, however, are often large and comprise many elements. As a result, the fixed phased array antenna is often too large or too expensive for many of its potential applications. Nevertheless, a relatively inexpensive phased array radar system which retains at least the essential precision tracking performance of a relatively expensive phased array radar system is still highly useful and desirable.

A radar system according to one embodiment of the present invention includes means including a first antenna for transmitting RF burst signals in a first fan beam pattern with the beamwidth in one geometric plane being relatively wide with respect to the second orthogonal geometric plane and means including a second antenna for receiving reflected RF burst signals where the second antenna is of the type exhibiting a controllable second fan beam pattern orthogonal to said first fan beam pattern. The second antenna is controlled to scan the second fan beam pattern in the one geometric plane.

In the drawings, which are not drawn to scale:

FIG. 8 illustrates the stepped scan azimuth pattern of the second linear array of FIG. 6 overlaid on the first linear array azimuth pattern;

FIG. 10 illustrates the stepped scan elevation pattern of the first linear array of FIG. 6 overlaid on the second linear array elevation pattern; and FIG. 11 illustrates four arrays as shown in FIGS. 1 and 6 about a tower for 360° azimuth coverage.

Figure 1:
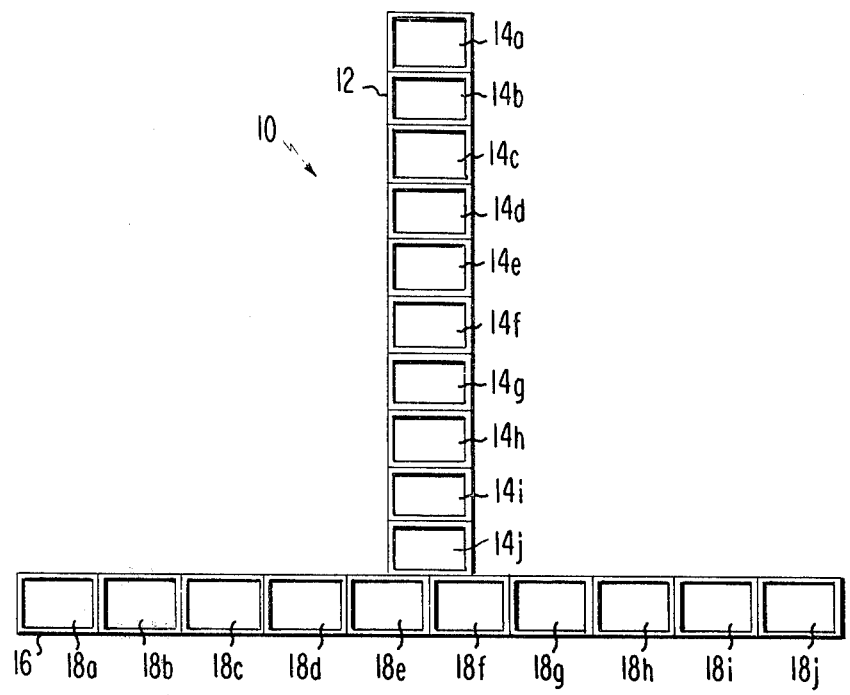
FIG. 1 is a sketch of a phased array antenna having first and second linear arrays of radiating elements embodying the principles of the present invention.

Referring to FIG. 1, there is illustrated a phased array antenna 10 including a first linear array 12 comprised of, for example, ten antenna elements 14a thru 14j which are referred to collectively as elements 14 and a second linear array 16 comprised of, for example, ten antenna elements 18a through 18j which are referred to collectively as elements 18. These antenna elements 14 or 18 are, for example, rectangular horn or waveguide radiators as represented by the rectangles. The borders of the rectangles represent the conductive walls of the horn or waveguide antenna.

As well known in the art, a linear array is a class of arrays in which the antenna elements are arranged along a straight line, usually with equal spacing between elements. Although the particular choice of antenna element, 14 or 18, is optional, and dependent upon the particular needs of the designer, i.e., waveguide radiators, dipoles or the like may be used, it is preferred in this embodiment that the elements 14 and 18 of the first and second linear arrays, 12 and 16, respectively, be identical. As illustrated in FIG. 1, the first and second linear arrays 12 and 16 are arranged orthogonally and in the shape of an inverted "T." It should be understood that other configurations can be employed. For example, the first and second linear arrays, 12 and 16, respectively, can be arranged in the shape of an "L" or a "T" or a "+" or an "X" or like.

In order to simplify the signal processing and understanding of the radar system, which is more fully described below, it is preferred that the linear arrays at least be orthogonal with respect to each other. For clarity, it is assumed throughout this description that the first linear array 12 lies in a vertical, or elevation, plane which can be designated as a plane perpendicular to an azimuthal plane. In addition, the second linear array 16 is designated as lying in the azimuth plane perpendicular to the elevation plane. Preferably, to simplify the system feed networks, each of the elements 14 of the first linear array 12 is operationally independent from the antenna elements 18 of the second linear array 16. That is, the first linear array 12 and the second linear array 16 should be arranged so that the respective elements, 14 and 18, thereof only function within their respective arrays and that no antenna element is operational in both linear arrays.

Figure 2:
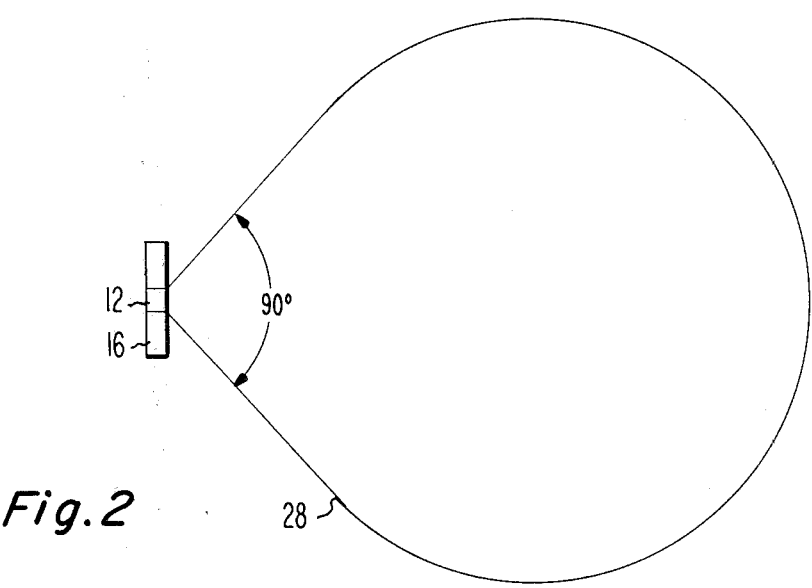
FIG. 2 is an illustration of the azimuthal radiation pattern of the first linear array shown in FIG. 1.
Figure 3:
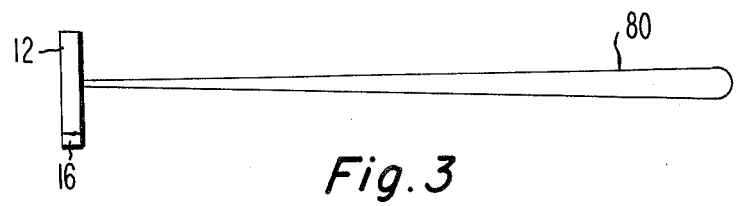
FIG. 3 is an illustration of the elevation radiation pattern of the first linear array shown in FIG. 1.

FIGS. 2 through 5 show typical radiation patterns of the first linear array and the second linear array, respectively. Specifically, FIG. 2 shows the radiation pattern 28 of the first linear array 12 in a first plane or the azimuth plane. It is a fan beam having a relatively large beamwidth angle in azimuth and narrow beamwidth in elevation. Typically, the beamwidth angle of a linear array 12 in the azimuth plane is on the order of about 90°. FIG. 3 shows the radiation pattern 80 of array 12 in the elevation plane. It has a comparatively narrower beamwidth angle which, for example, may be on the order of about 1.1°. The more elements 14 the narrower the pattern 80.

Figure 4:
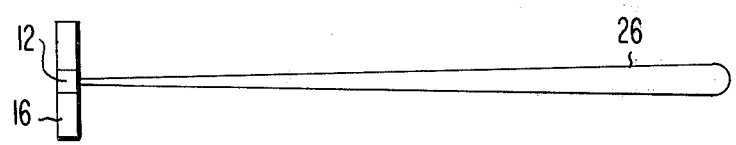
FIG. 4 is an illustration of the azimuthal radiation pattern of the second linear array shown in FIG. 1.
Figure 5:
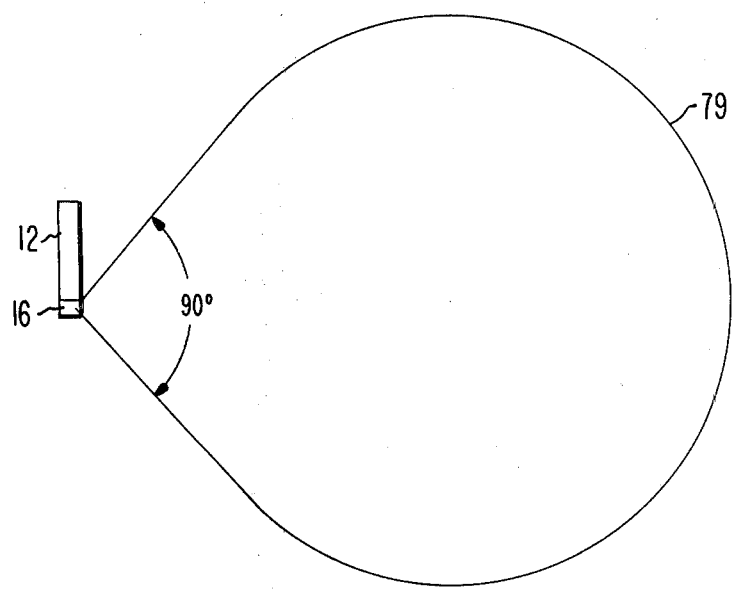
FIG. 5 is an illustration of the elevation radiation pattern of the second linear array shown in FIG. 1.

Similarly, FIGS. 4 and 5 illustrate the fan beam radiation patterns of the second linear array 16 and which are, in fact, orthogonal to the respective patterns depicted in FIGS. 2 and 3. In FIG. 4, the radiation pattern 26 of array 16 in the azimuth plane is relatively narrow; the beamwidth may be about 1.1°, for example. Again, the more elements, the narrower the beam. In FIG. 5, the radiation pattern 79 of array 16 in the elevation plane is broad, on the order of 90°, for example.

Referring to the first linear array 12, if only this array were used to transmit and receive, any target information received would be imprecise. One could not ascertain the location in azimuth of a target any better than that it was in a 90° sector. Likewise, if the second linear array 16 were operated independently, its target information would be equally imprecise with respect to elevation angle.

In accordance with the present invention, an accurate system can be provided by transmitting via a first linear array and receiving via a second linear array, because the fan beam of the first linear array is intersected orthogonally by the narrow dimension of the fan beam of the second linear array. For example, if a signal is radiated from the first linear array 12 and target return information is acquired by the second linear array 16 that information will be reasonably accurate in azimuth due to the relative small beamwidth angle of the second array in azimuth. Similarly, if an RF signal is transmitted from the second linear array 16 and target return information is acquired by the first linear array 12 that information will be reasonably accurate in elevation due to the relatively small beamwidth angle of the first linear array in elevation.

Figure 6:
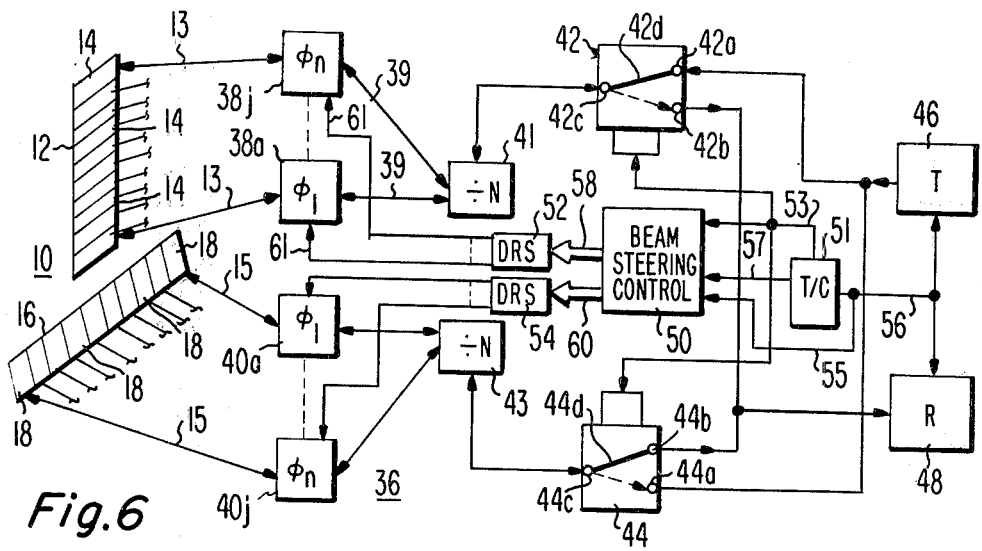
FIG. 6 is a block diagram of a phased array radar system embodying the principles of the present invention.

A block diagram of a phased array radar system 36 designed to operate in conjunction with the antenna 10 is shown in FIG. 6. Each of the array elements 14 of vertical array 12 is coupled via separate transmission lines 13 to a corresponding one of the phase shifters 38a through 38j. Similarly, each of the array elements 18 of horizontal array 16 is coupled via separate transmission lines 15 to a corresponding one of the phase shifters 40a through 40j. The phase shifters 38a through 38j and 40a through 40j can be a known type of ferrite phase shifter, for example, or a known type of diode digitally controlled phase shifter. As is well known in the art, the pointing direction of the radiation pattern or beam of an array is adjusted by controlling the relative phase of the signals at the array elements using these phase shifters. The beams can be made to scan by sequentially changing the phase of the signals using the phase shifters under command from beam steering controller 50. It is understood that while only two phase shifters 38a 1 and 38j are illustrated explicitly in FIG. 6, there are, in this example, eight more phase shifters and corresponding transmission lines 13 (indicated schematically by the dashed line between each of these phase shifters 38a and 38j) so there is one phase shifter for each radiating element. Likewise, there are, for the example, a total of ten phase shifters 40a–40j and corresponding transmission lines 15 coupled to the array elements 18, one phase shifter for each of the array element 18.

Radar transmitter 46, which includes an RF burst generator, is coupled via transmit/receive switches 42 and 44 and divide-by-N power dividers 41 and 43 to the phase shifters 38a through 38j and 40a through 40j. Likewise, the radar receiver 48 is coupled to these phase shifters via transmit/receive switches 42 and 44 and divide-by-N power dividers 41 and 43. The divide-by-N power dividers 41 and 43, for the example, are 10-way power dividers in which an input signal to power divider 41 or 43 from the transmitter 46 equally divides the power from the transmitter 46 ten ways. The equally power divided signals are coupled to the respective phase shifters 38a through 38j or 40a through 40j. In the receive direction, the power dividers 41 and 43 function as power combiners to combine the ten signals from the antenna elements to one signal to then be applied via switch 42 or 44 to the receiver 48. The connection to receiver 48 is via terminal 42b of switch 42 or via terminal 44b of switch 44.

The radar transmitter 46 is coupled to the terminals 42a and 44a of transmit/receive switches 42 and 44 respectively. Terminal 42c of transmit/receive switch 42 is coupled to the input of divide-by-N power divider 41 and terminal 44c of transmit/receive switch 44 is coupled to the input of divide-by-N power divider 43. The radar transmitter 46 is, for example, a typical radar transmitter for generating a burst of radio frequency (RF) signals in response to a control signal. The receiver 48 is a typical radar receiver responsive to a reflected RF burst signal for deriving range and directional information. The system includes a beam steering controller 50, a system timing and control unit (T/C) 51 and phase shifter drivers 52 and 54. The timing and control unit 51 includes a clock and generates the necessary timing and control signals. The timing and control signals are coupled to switches 42 and 44 at appropriate time periods to switch between the transmit and receive conditions. Timing signals are also sent to the beam steering controller 50 which, for example, may be a computer including a random access memory and address generator which produces, in response to timing signals addresses to its memory, read out beam steering signals stored in the memory to appropriate phase shift drivers. These beam steering signals represent phase shift values and are in the form of binary signals. These beam steering signals are applied to separate phase shifter drivers 52 and 54. Phase shift drivers 52 and 54 provide, for example, the appropriate analog signals or binary signals to the phase shifters 38a through 38j or 40a through 40j to cause these phase shifters to provide the appropriate relative phases to consequently provide the appropriate beam angle. The phase shifters 38a through 38j or 40a through 40j may be ferrite type phase shifters or diode type phase shifters known in the state of the art.

In the operation of the system, accurate azimuth and elevation data can be obtained by alternating the transmit and receive functions of the linear array 16 and linear array 12. In order to obtain accurate azimuthal data, one needs to transmit a signal via the elements 14 of the vertical linear array 12 to produce a fan beam in azimuth (narrow in elevation) and operate the horizontal linear array 16 in the receive mode by sweeping in azimuth its beam (which is narrow in azimuth and wide in elevation). Thus, by radiating a transmitted pattern 28 via array 12 as illustrated in FIG. 2 having a relatively wide azimuthal beam and sweeping in azimuth the received pattern 26 illustrated in FIG. 4, from the array 16, having a relatively narrow beam in azimuth accurate azimuthal target information is obtained.

Figure 7:
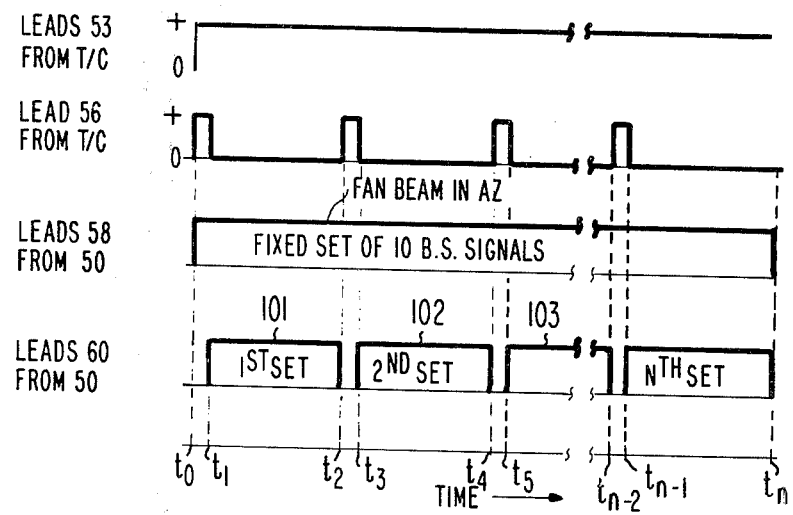
FIG. 7 is a timing diagram illustrating operation of the radar system of FIG. 6 in the azimuth mode.

Referring to the timing diagram of FIG. 7 and referring to the system of FIG. 6, an example of the operation of the system in the azimuth search mode is described briefly. At the time $t_0$, T/C control 51 provides a positive level pulse via leads 53 to switches 42 and 44. This energizes the switches so that the contact arms 42d and 44d are in the positions shown as solid arrows in FIG. 6 to provide coupling from 42c to 42a and 44c to 44b respectively. Also, via lead 56 a pulse is provided from T/C control 51 for a time period from $t_0$ to $t_1$ via lead 56 to transmitter 46 and receiver 48 to enable for this time period an RF burst signal from the transmitter 46 and to disable the receiver 48. The RF burst signal is then applied from the transmitter 46 via switch 42 to the divide-by-N divider 41. The RF signals from the transmitter 46 are then applied equally via ten separate leads 39 to the phase shifters 38a through 38j and to radiating elements 14 of array 12. The high level pulse signal from the T/C 51 on leads 53 is also applied to the beam steering controller 50 which in response thereto provides via ten leads 58, ten separate binary coded beam steering signals, for example, ten 8-bit words or ten bytes, from its memory to the ten separate phase shifter dividers 52. A byte is sent to each phase shift driver which provides a corresponding signal to an associated phase shifter. These ten bytes are beam steering signals which are then separately routed via ten leads 61 to the separate phase shifters 38a through 38j. These beam steering signals are of a binary value to produce at these phase shifters phase shift values to produce the fan beam illustrated, for example, in FIG. 2 when the transmitter is enabled. These beam steering signals continue for the duration of the time period between $t_0$ and $t_n$ which coincides with the time period required to scan the orthogonal beam in azimuth. The transmitter 46 is enabled an extremely short period of time relative to the receive time period to follow and shorter than illustrated. The waveforms shown in FIG. 7 are only for purposes of illustration in describing the invention and do not represent actual time periods. The fan beam as illustrated, for example, in FIG. 2 is transmitted between time $t_0$ and $t_1$. At time $t_1$ the signal from T/C 51 on lead 56 drops to a low level causing the transmitter 46 to be disabled and the receiver to be enabled and further via lead 55 to cause the beam steering controller 50 to produce from its memory a first set 101 of ten beam steering (B.S) signals or bytes to the ten phase shift drivers 54 for phase shifters 40a through 40j. Beam steering controller 50 provides ten separate binary coded signals or ten bytes for example. Each byte represents a phase shift control value for one of the phase shifters 40a through 40j. The phase shift values are such as to form a narrow beam of the shape of pattern 26 as shown in FIG. 4 in a direction at one extreme edge of the radiated pattern 28 in FIG. 2. Referring to FIG. 8, there is illustrated, for example, the fan beam azimuth pattern 28 associated with the transmitted signal from array 12 and superimposed selected azimuth patterns 26a through 26n associated with array 16. Azimuth pattern 26a represents the pattern associated with the first set 101 of beam steering signals applied to the phase shifters 40a–14j. When at this initial condition, the phase shift values from drivers 54 remain over the time period from $t_1$ to $t_2$ which is sufficient time for any RF transmitter signal to be reflected from any desired target. The reflected RF signals or echo signals from targets in pattern 26a are picked up at array 16 and are coupled via the transmission lines 15 to the phase shifters 40a through 40j and then to the divide-by-N divider 43. These signals are combined at divider 43 and coupled through switch 44 (terminals 44c, 44b) to the receiver 48.

At time $t_2$, a signal is applied via lead 56 to again enable transmitter 46 and disable receiver 48 and apply the same RF burst transmitted signal in the same azimuth pattern 28 via array 12. The phase shift values provided from the beam steering controller 51 to drivers 52 and to the phase shifters 38a–38j are identical to that previously transmitted or repeated so that the radiated pattern is again pattern 28 is in the same direction and the shape transmitted previously. At time $t_3$, after a second RF burst is transmitted, the signal on lead 56 goes to a low value enabling receiver 48 and disabling transmitter 46 and providing a second low level signal to the beam steering controller 50 which then in response to the end of the second high level pulse on lead 55 provides in response thereto a second set of beam steering signals (ten separate bytes) from its memory via leads 60 to drivers 54 providing a second set of ten phase shift values to phase shifters 40a through 40j to steer or step the beam pattern 26 to that illustrated as dashed lines 26b in FIG. 8. The reflected RF signals or echo signals from targets in pattern 26b are picked up at the array 16, are then coupled to the receiver via the phase shifters 40a through 40j, the divide-by-N divider 43 and switch 44. At time $t_4$, the transmitter 46 is again energized to transmit the same pattern 28 with the same phase shift values at 38a through 38j to array 12 until time $t_5$. At time $t_5$, the signal on lead 56 again goes low, disabling the transmitter 46 and enabling the receiver 48 while at the same time providing a third low level signal to beam steering controller 50, which in response thereto provides a third set of ten beam steering signals via the drivers 54 to the phase shifters 40a through 40j. This third set moves or steers the direction of the beam 26 to that illustrated in position 26c in FIG. 8. This process of transmitting the same fixed fan beam or pattern from array 12 and sending a different set of beam steering signals to provide the narrow pattern 26 adjacent to the previous pattern from antenna array 16 continues for N period of times, or N set of beam steering signals so as to scan the beam 26 across the entire azimuth beamwidth of the transmitted fan beam 28 to and including pattern 26n.

Figure 9:
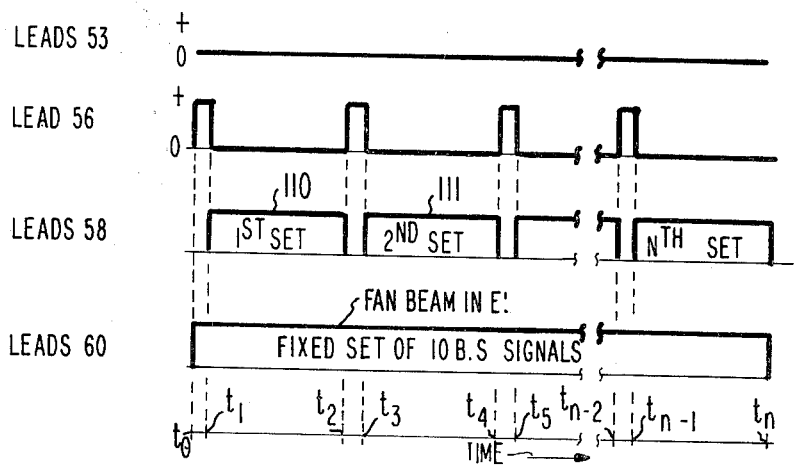
FIG. 9 is a timing diagram illustrating operation of the radar system of FIG. 6 in the elevation mode.

Similarly, the system may be arranged to obtain elevation data by basically transmitting via antenna array 16 and receiving via antenna array 12. This operation is discussed in connection with the timing diagram of FIG. 9. In this mode of operation, the signals from the timing and control (T/C) 51 provide via signal lead 53, a change in level value so that the switches 42 and 44 are in the positions shown by dashed arrows to provide connection of the transmitter 46 via switch 44 to the divide-by-N divider 43 and connection of the receiver 48 via the switch 42 to divide-by-N divider 41. At time period $t_0$, the signal out of the timing and control (T/C) 51 on lead 56 again energizes the transmitter 46 and disables the receiver 48 and provides a signal to the beam steering controller 50 to provide the ten beam steering signals (ten bytes for example) via ten separate leads 60 and drivers 54 to the phase shifters 40a and 40j from time $t_0$ to $t_n$. The elements 18 of array 16 then transmit the fan beamwidth pattern 79 in the elevation plane as illustrated in FIG. 5 and in FIG. 10. This pattern 79 is transmitted each time the transmitter 46 is energized in a manner similar to that described above in connection with azimuth. In the receive mode, the beam steering controller 50 provides beam steering signals via leads 58 to drivers 52 and transmission lines 61 to the phase shifters 38a through 38j. The receive signals from the elements 14 of array 12 are coupled via transmission line 13, phase shifters 38a through 38j and combine at divider 41. The combined signals are then coupled via switch 42 to the receiver 48. At time $t_1$ the signal level on leads 56 and 55 drops to a low level. The controller 50 produces from its memory from time t₁ to t₂ a first set 110 of ten beam steering signals that provides pattern 80 as shown at 80a in FIG. 10 at one extreme bottom edge of the pattern 79 transmitted by array 16 to receive any reflected RF signals or echo signals from any targets in the region of pattern 80a. At time t₂, the same radiated pattern 79 is again transmitted from array 16 with the same phase values at phase shifters 40a through 40j. At time t₃ when the transmitter 46 is deenergized and the receiver is coupled to array 12 the phase shift values at phase shifters 38a through 38j, as controlled by a second set 111 of beam steering signals on lead 58, are such as to steer elevation pattern 80 of array 12 to the position 80b adjacent to 80a. Similar to that described previously, the transmitted fan beam from array 16 remains the same while the pattern of array 12 is sequentially stepped so as to scan the region of pattern 79 of the array 16 as illustrated by sequential dashed lines 80a through 80n.

The transmitted fan beam can be stepped after each completed scan in the receive mode to provide complete surveillance. For the above example after time $t_n$, a new fixed or repeated set of beam steering signals are provided from the beam steering controller 50 via leads 58 for the azimuth mode and from beam steering controller 50 via leads 60 for the elevation mode. The sequence of these repeated or fixed set of beam steering signals may be sets 110, 111, etc for azimuth mode and sets 101, 102, etc for the elevation mode. This stepping can be controlled by timing signals from T/C 51 via lead 57 or by a divide N count from lead 56.

The above system is illustrated only by way of example and in actual practice it may be desirable to transmit the fan beam and then provide a sequence of phase shift values such that the receive beam is repetitively scanned so as to scan the entire area of the transmitted beam without retransmitting the fan beam between each received beam position. The above described operation is in the surveillance mode. If each of these fan beams provides 90° coverage, four such pairs of arrays 10a, 10b, 10c and 10d, can be mounted about support tower 90 as illustrated in FIG. 11 to achieve 360° coverage. In the tracking mode the beam steering controller 50 stores information with regard to the previous position of the tracked target provided from the receiver and therefore transmits a fan beam in the stored direction of the tracked target and steers the receive antenna so the pattern covers only over the expected region of the tracked target.

Although switches 42 and 44 are represented as relays, this is only to illustrate operation. These switches would more preferably be one of the more commonly known types of high speed electronic switching devices such as those using transistors.

We claim:

1. A radar system comprising:
   means including a first antenna for transmitting RF burst signals in a fan beam pattern with the beamwidth in one geometric plane being relatively wide relative to the beamwidth in a second orthogonal geometric plane;
   means for receiving reflected RF burst signals, said receiving means including a receiving antenna of the type exhibiting a second fan beam pattern orthogonal to said first fan beam pattern where said beamwidth is relatively narrow in said one geometric plane relative to said second orthogonal geometric plane;
   means coupled to said receiving antenna for scanning said second fan beam associated therewith in said one geometric plane, said means for scanning including means for sequentially stepping said second fan beam pattern over the region covered by said first fan beam pattern in said one geometric plane; and
   means for repetitively transmitting said RF burst signals in said first fan beam pattern between each sequence step of said second fan beam.

2. The combination claimed in claim 1, wherein said first antenna is a first linear array and said receiving antenna is a second linear array arranged orthogonal to said first linear array.

3. A phase-array radar system comprising:
   a first linear array of radiating elements;
   a second linear array of radiating elements oriented generally orthogonal to said first linear array;
   means for generating RF burst signals;
   means for detecting any echo return signal in response to said RF burst signal;
   means when in a first condition for coupling said RF burst signals from said generating means to said first linear array and simultaneously coupling said second linear array to said detecting means and for when in a second condition coupling said RF burst signals from said generating means to said second linear array and coupling said first linear array to said detecting means;
   first means coupled to said second linear array for when said coupling means is in said first condition changing the relative phases of the signals received at the elements of said second linear array a predetermined time period after said RF burst signals are transmitted, said predetermined time period being such that all desired echo signals from said RF burst signal are received at the second linear array; and
   second means coupled to said first linear array for when said coupling means is in said second condition changing the relative phases of the signals at the elements of said first linear array and predetermined time period after said RF burst is transmitted.

4. The combination of claim 3, wherein said first and second means for changing the relative phases of said signals includes a phase shifter associated with each radiating element.

* * * * *

UNITED STATES PATENT AND TRADEMARK OFFICE
CERTIFICATE OF CORRECTION

PATENT NO. : 4,336,540

DATED : June 22, 1982

INVENTOR(S) : William V. Goodwin et al.

It is certified that error appears in the above-identified patent and that said Letters Patent is hereby corrected as shown below:

Column 3, line 49: delete "1".

Column 5, line 54: change "14j" to ---40j---.

Column 8, line 25: change "phase-array" to

---phased array---.

Signed and Sealed this

Fourteenth Day of September 1982

[SEAL]

Attest:

GERALD J. MOSSINGHOFF

*Attesting Officer*  *Commissioner of Patents and Trademarks*